J. A. PILCHER.
BRAKE LEVER FOR CAR TRUCKS.
APPLICATION FILED APR. 1, 1916.
1,241,441. Patented Sept. 25, 1917.
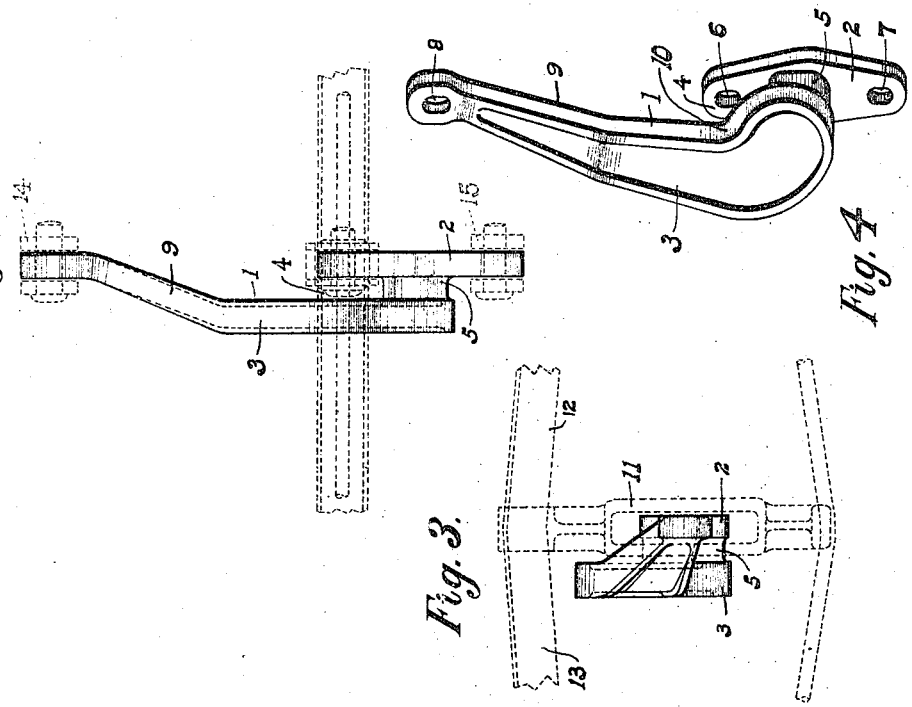
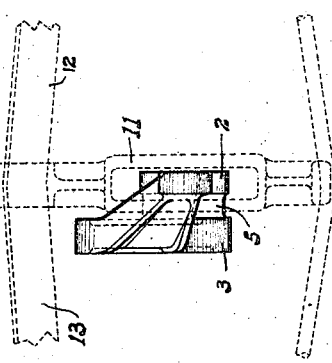
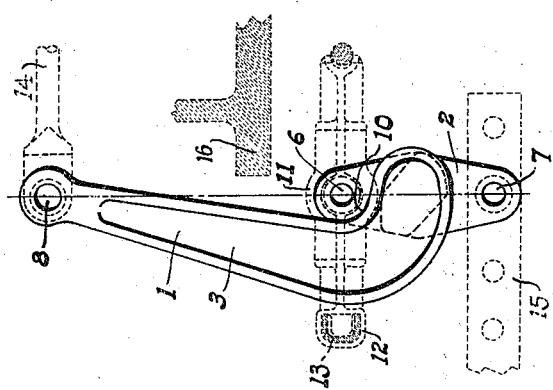

UNITED STATES PATENT OFFICE.

JOHN A. PILCHER, OF ROANOKE, VIRGINIA.

BRAKE-LEVER FOR CAR-TRUCKS.

1,241,441.     Specification of Letters Patent.     Patented Sept. 25, 1917.

Application filed April 1, 1916. Serial No. 88,280.

*To all whom it may concern:*

Be it known that I, JOHN A. PILCHER, a citizen of the United States, residing at Roanoke, in the county of Roanoke and State of Virginia, have invented certain new and useful Improvements in Brake-Levers for Car-Trucks, of which the following is a specification.

This invention pertains to brake levers for use in connection with railway equipment, and the present application is a companion to my co-pending application Serial Number 88,279, filed April 1, 1916. The principal object thereof is to provide a three-hole lever having an open space between the middle and the top hole, and adapted for use with existing forms of brake beams.

With this and other objects in view the invention consists in the peculiar formation of a lever as set forth herein, also in combination therewith the various related truck parts as herein described and as particularly claimed.

In the accompanying drawings, Figure 1 is a side elevational view of the lever of my invention, certain related brake parts and a portion of the truck structure being shown in dotted lines and partly in section. Fig. 2 is an end elevational view and Fig. 3 a plan view of the same, certain brake parts being shown in dotted lines. Fig. 4 is a perspective view of the lever detached from the other associated parts.

Referring to these drawings it will be seen that the invention has to do with what is termed a three-hole lever; that is, a lever having transversely disposed holes at the upper and lower extremities and a similar hole between these extremities. These three holes are in substantial alinement when viewed in side elevational view, and the lever is intended to replace the ordinary three-hole lever made of a straight bar of metal. The lever, designated as 1, is composed primarily of two portions, designated 2 and 3, occupying substantially parallel planes. These portions are removed slightly from each other so as to provide an interval 4 between the portions where they overlap and they are connected between their opposing faces by means of a torsional member 5. The portion 2 extends in a continuous plane when viewed in end elevational view and is in reality a flat bar in the upper extremity of which is located the middle hole 6 and having the bottom hole 7 in its lower extremity.

The portion 3 of the lever may be said to originate as an outward offset, (the torsional member 5) from the portion 2 and it then follows for a portion of its length a plane substantially parallel with but removed from that of the portion 2. But near its top it is again inwardly offset at 9 so that the upper extremity falls substantially within the same plane as that of the portion 2. In this upper extremity is located the upper hole 8 and by having these three holes in substantially the same plane all twisting tendencies are removed from the brake beam and the lever-actuating members, and the lever functionates with respect to the connected parts the same as a straight bar lever.

In the side elevational view it will be seen that the portion 3 of this lever, as it proceeds from its origin between the holes 6 and 7 in the portion 2 extends in the same general direction as and to a position beyond the middle hole 6. But in progressing along this path this portion is curved away at 10 from the normal line of the lever beginning in the vicinity of the over-traveled hole 6, in such manner as to entirely uncover this hole 6. Thus a brake pin may be readily inserted in this hole from either side without hindrance from the portion 3 of the lever.

This lever is pivotally-connected at the hole 6 to a transversely-pierced jaw-shaped fulcrum 11 on a suitable brake beam 12, this brake beam having a bar member 13 to the front side of which is secured the fulcrum 11. The portion 3 of the lever passes inside this bar member, that is, between the fulcrum hole 6 and the adjacent edge of the bar member. The lever in service swings about the point 6 as a center hence the portion 3 is formed to follow an arcuate path with the axis of the hole 6 as a point of origin. The lever is actuated by means of one or the other of the lever-actuating members 14 and 15 which are pivoted respectively thereto at the holes 8 and 7. The path of the portion 3 is removed from the normal line of the lever for almost its entire length so that there is provided an open space in the lever between the middle hole 6 and the upper hole 8, which may be occupied by any other portion of the truck structure such as indicated at 16. The interval 4 between the first and second portions of this lever forms space to movably accommodate the one side of the jaws of the brake beam fulcrum.

Having thus described my invention, what I claim as new and desire to secure by Letters Patent is:

1. A three-hole lever composed of two portions occupying substantially parallel planes and having a torsional connecting member, two of the holes thereof being respectively in the extremities of the first of said portions and the third hole being in the one extremity of the second portion, the said torsional member being affixed to the said first portion between the two said holes therein and being affixed to the said second portion at the unpierced extremity thereof.

2. A three-hole lever having a first portion thereof extending in a continuous plane and in the extremities of which portion are located two adjacent of the said holes, the said lever having a second portion thereof originating as an outward offset from the side of the said first portion between the two holes therein and then traversing for a portion of its length a plane substantially parallel with but removed from that of the said first portion, and being finally inwardly offset so as to terminate in substantially the same plane as that of the said first portion, in which terminal is located the third of said holes.

3. A three-hole lever composed of two spaced portions occupying adjacent and substantially parallel planes and having a torsional connecting member, two of the holes thereof being respectively in the extremities of the first of said portions and the third hole being in the one extremity of the second portion, the said torsional member being affixed to the said first portion between the two said holes therein and being affixed to the said second portion at the unpierced extremity thereof, the said second portion extending from its point of origin in the same general direction as and to a position beyond the one extremity of the said first portion.

4. A three-hole lever composed of two spaced portions occupying adjacent and substantially parallel planes and having a torsional connecting member, two of the holes thereof being respectively in the extremities of the first of said portions and the third hole being in the one extremity of the second portion, the said torsional member being affixed to the said first portion between the two said holes therein and being affixed to the said second portion at the unpierced extremity thereof, the said second portion extending from its point of origin in the same general direction as and to a position beyond the one extremity of the said first portion, but being curved away from the line of the said first portion in the vicinity of the over-traveled hole therein in such manner as to entirely uncover the said hole.

5. A three-hole lever composed of two spaced portions occupying adjacent and substantially parallel planes and having a torsional connecting member, two of the holes thereof being respectively in the extremities of the first of said portions and the third hole being in the one extremity of the second portion, the said torsional member being affixed to the said first portion between the two said holes therein and being affixed to the said second portion at the unpierced extremity thereof, the said second portion extending from its point of connection to the said first portion in the same general direction as and to a position beyond the one extremity of the said first portion, but being curved away from the line of the said first portion in the vicinity of the over-traveled hole therein in such manner as to entirely uncover the said hole, the said curved portion following substantially an arcuate path about the axis of said hole as a center.

6. A three-hole lever composed of two spaced portions occupying adjacent and substantially parallel planes and having a torsional connecting member, the three holes being substantially in a common line, two of the holes being respectively in the upper and lower extremities of the first of said portions and the third hole being in the upper extremity of the second portion, the said torsional member connecting the opposing faces of the two portions of the said lever and being affixed to the said first portion between the two said holes therein and being affixed to the said second portion at the unpierced extremity thereof, the said second portion extending from its point of connection to the said first portion in the same general direction as and to a position beyond the upper extremity of the said first portion, but being curved away from the normal line of the said lever in the vicinity of the middle hole thereof, the said curved portion following substantially an arcuate path about the axis of said hole as a center and proceeding thence in a path removed from the normal line of said lever, but falling within such line near the upper extremity of said second portion, there being an open space in the normal line of said lever between the middle and upper holes thereof.

7. A lever composed of two spaced portions occupying substantially parallel but removed planes and having a torsional connecting member, a transversely disposed hole in each extremity of the first of said portions and a similar hole in the one extremity of the second portion, the said torsional member being affixed to the said first portion between the two said holes therein and being affixed to the said second portion at the unpierced extremity thereof, in combination with a brake beam having a bar member and a transversely pierced jaw-shaped fulcrum attached thereto, one extremity of the first portion of said lever being disposed within the jaw of said fulcrum and the holes thereof being in alinement, the second portion of said lever being disposed without and to the side of the said jaw, the interval between the said portions of the lever being formed to receive and movably accommodate the one side member of said jaw-shaped fulcrum.

In testimony whereof I affix my signature in presence of two witnesses.

JOHN A. PILCHER.

Witnesses:
 H. B. WADE,
 ROY K. BROWN.

Copies of this patent may be obtained for five cents each, by addressing the "Commissioner of Patents, Washington, D. C."